United States Patent [19]

Graff

[11] 4,351,447
[45] Sep. 28, 1982

[54] REUSABLE RESILIENTLY DISTORTABLE SHEET PLASTIC CLOSURE FOR APPLICATION TO RIMMED CONTAINERS

[76] Inventor: Stewart M. Graff, c/o Douglas Stephens Plastics, Inc., 101 E. Main St., Little Falls, N.J. 07424

[21] Appl. No.: 289,032

[22] Filed: Jul. 31, 1981

[51] Int. Cl.$^3$ .................... B65D 41/16; B65D 41/18
[52] U.S. Cl. ........................................ 220/306; 150/0.5
[58] Field of Search ............... 220/306, 260; 150/0.5; 229/43; 206/45.32; 215/321; 312/284

[56] References Cited

U.S. PATENT DOCUMENTS

| D. 244,741 | 6/1977 | Daenen ................................ D7/17 |
| 2,864,546 | 12/1958 | Aldington ............................. 229/43 |
| 3,298,415 | 1/1967 | Klygis ................................... 150/0.5 |
| 3,298,505 | 1/1967 | Stephenson ....................... 206/45.31 |
| 3,298,593 | 1/1967 | Stephenson ............................ 229/43 |
| 3,307,603 | 3/1967 | Swett ................................... 150/0.5 |
| 3,511,288 | 4/1968 | Swett et al. ......................... 150/0.5 |
| 3,690,902 | 9/1972 | Dahl .................................... 150/0.5 |
| 3,794,090 | 2/1974 | Commisso ........................... 150/0.5 |
| 3,830,395 | 8/1974 | Crisci .................................. 215/321 |
| 3,902,540 | 9/1975 | Commisso ........................... 150/0.5 |
| 3,955,710 | 5/1976 | Commisso ........................... 220/306 |
| 4,061,241 | 12/1977 | Retelny ............................... 229/43 |

Primary Examiner—George T. Hall
Attorney, Agent, or Firm—Kirschstein, Kirschstein, Ottinger & Cobrin

[57] ABSTRACT

A reusable resiliently restorable flexible sheet plastic closure is applied to a comestible-storing rimmed container. The closure has a crown and a skirt which is attached to and downwardly dependent from the crown. The crown and skirt are attached to one another by a generously rounded section. Positioned circumferentially around the free edge of the skirt is a retroverted lip which extends under the rim of the container for tightly locking the closure to the container. On the lower end of the skirt is a pair of diametrically opposed radially extending pull tabs in one-piece with and joined to the skirt by a generally S-shaped section. The pull tabs are capable of diametrically distorting the closure when pulled radially outwardly by a user to thereby unlock the closure by radially extending the retroverted lip such that it clears the container rim. Thus removal of the closure from the container occurs without destroying the integrity of either the retroverted lip, the closure or the container.

The above-described closure and container, when used in combination, provide a method for repeatedly storing comestibles using the same closure and container due to the fact that said closure may be integrally removed from said container and reapplied in its unimpaired state thereto when so desired.

8 Claims, 4 Drawing Figures

REUSABLE RESILIENTLY DISTORTABLE SHEET PLASTIC CLOSURE FOR APPLICATION TO RIMMED CONTAINERS

BACKGROUND OF THE INVENTION

1. Field of the Invention

A reusable resiliently distortable sheet plastic closure for application to rimmed containers of the type in which edible goods are stored.

2. Description of the Prior Art

Storage of comestibles in rimmed containers which are closable with covers is known in the art. It is desirable to have the cover securely and tightly attached to the container to thus avoid the accidental removal of said cover from the container with resultant accidental escape of the comestibles. The container and cover should be inexpensive to manufacture to avoid unduly increasing the cost of the comestibles contained therein. Additionally, although the cover should be tightly mounted on the container, it desirably should be easily detached from said container when a user desires to so remove it. Further, it is advantageous if said cover is formed so as to retain its integrity when removed from the container thus permitting re-application of said cover to said container if so desired.

U.S. Letters Pat. No. 4,061,241 discloses an oval cover for a food plate with two opposed tabs thereon. The two tabs are introducible into slots on the plate for retaining said cover on said plate.

U.S. Letters Pat. No. 3,298,505 discloses a closure for a food container with outwardly extending tabs which are usable for providing a grasping portion to aid a user in tearing the closure along a score line which is radially within the cover.

SUMMARY OF THE INVENTION

1. Objects of the Invention

It is an object of the present invention to provide an improved reusable closure for application to rimmed containers of the type usable to store edible goods.

It is another object to provide a closure of the type described which avoids the various disadvantages of prior art closures.

Still another object is the provision of a closure of the type described which tightly locks onto a container but which is easily removable therefrom.

It is yet a further object of the invention to provide a closure of the type described which retains its integrity when removed from a container thereby enabling it to be reused.

Another object is the provision of a closure of the type described which can be removed from a container without allowing the accidental escape of the contents of the container.

An additional object is the provision of a closure of the type described which is inexpensive to manufacture.

Still a further object is to provide a closure of the type described which can be removed from a container without any specialized equipment.

Other objects of the present invention in part will be obvious and in part will be pointed out hereinafter.

2. Brief Description of the Invention

In keeping with these objects and others which will become apparent hereinafter, one feature of the invention resides, briefly stated, in a reusable one-piece resiliently distortable sheet plastic closure for application to rimmed containers of the type usable to store edible goods.

The closure is characterized by the provision of: a crown, a skirt which is downwardly dependent from the periphery of the crown and which is joined thereto by a generously rounded section, retroverted means at the free edge of the skirt for detachably and mechanically tightly locking the closure to the rim of the container by extending under said rim, and at least one pair of diametrically opposed radially extending pull tabs which are situated at the retroverted means or the free edge of the skirt. The closure is made of resilient plastic sheet material.

The pair of opposed radially extending pull tabs are operable for diametrically elongatably resiliently distorting the closure when they are pulled radially outwardly by a user. Said distortion of the closure unlocks diametrically opposed segments of the locking means by radially extending the same so that they will clear the rim. In this manner the closure can be removed from the container without destroying the integrity of the locking means, the closure or the container and hence, said closure can be reapplied in unimpaired condition to the container.

Another feature of the invention resides in a method for repeatedly storing comestibles in the same container using the above-described resiliently distortable closure. After comestibles are placed in an appropriate container, the latter is tightly and lockingly covered with the closure. When a user desires to open the container, he pulls radially outwardly on the pair of pull tabs to thus distort the closure and unlock the locking means. The closure in its unlocked state may be easily lifted from the container and the desired amount of edible goods removed from the latter. The user may then re-close said container using the unimpaired closure, by placing said closure on said container such that the retroverted locking means again extends under the rim of the container.

When the pair of pull tabs on the closure are pulled radially outwardly by a user, the container is retained in place on whatever horizontal surface it is lying by the weight of the comestibles contained in said container. Thus, for proper functioning of the above-described closure, the comestibles stored in the container should be of a sufficient weight to so retain the container in place when the tabs are pulled by the user.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
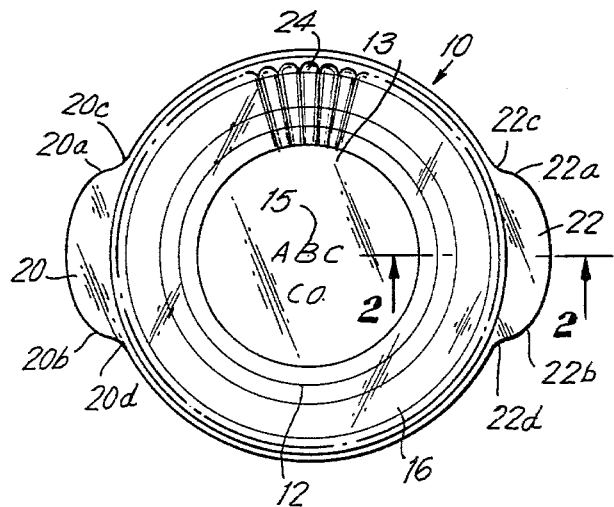
FIG. 1 is a top plan view of a one-piece reusable plastic closure of the present invention.

Referring now in detail to the drawings, the reference numeral 10 denotes a reusable resiliently distortable sheet plastic closure adapted to be applied to a rimmed container 12 of the type in which edible goods are stored. The closure 10 is detachably and mechanically tightly locked to the container 12 by a locking means 14 as described in more detail hereinafter. As used herein, the phrase "tightly locked" denotes that the closure is securely attached to the container such that said closure will not detach from said container in the absence of specified manipulation of said closure by a user. The specified manipulation of the closure which permits removal of same from the container, is described in detail hereinafter.

Container 12 is usable to hold comestibles and is of substantially the same size as closure 10. Closure 10 and container 12 may be of any appropriate size and shape, the only requirement being that the size of the closure be substantially similar to the size of the container so that the closure may be mechanically applied to and tightly locked on the container. In one preferred embodiment, both said closure and said container are circularly shaped in plan. In another embodiment both said closure and said container are ovoid-shaped in plan. The container may be a generally flat disc or it may be a moderately or deeply dished receptacle.

The closure 10 is formed of any appropriate flexible resilient sheet plastic material, and in a preferred embodiment said closure is formed of a transparent flexible resilient sheet plastic so that the comestibles held within the container are viewable to consumers. Said sheet plastic material must be sufficiently flexible and resilient to permit the closure to be locked onto the container and to permit said closure to be resiliently distortable. Indicia means 15 may be included on the closure, and by way of example, said indicia means may constitute printing on said closure indicating the store in which the comestibles in the container were purchased.

Figure 2:
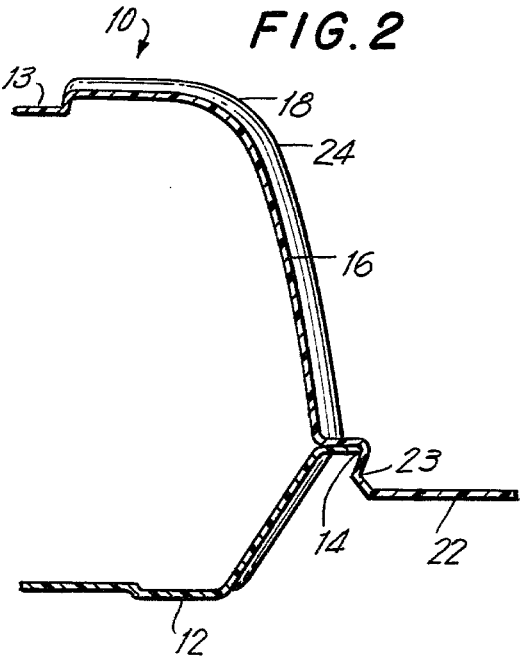
FIG. 2 is an enlarged fragmentary sectional view taken substantially along the line 2—2 of FIG. 1.
Figure 4:
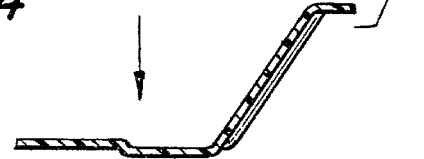
FIG. 4 is an enlarged sectional view analagous to FIG. 2 showing the closure and its associated rimmed container after the former has been removed from the latter.

Closure 10 is provided with a crown 13 and a skirt 16 which is operatively attached to, and downwardly dependent from, crown 13. Said skirt 16 is joined to said skirt 16 by a generously rounded section 18, best shown in FIGS. 2 and 4.

As heretofore mentioned, closure 10 is attached to container 12 by the locking means 14. Locking means 14 is at the lower free edge of the skirt 16 and is retroverted. In a preferred embodiment, said locking means 14 constitutes a downwardly and inwardly extending lip which extends circumferentially around the lower portion of skirt 16. Retroverted locking means 16 is shaped and dimensioned for a locking snap-fit under the rim of container 12.

Closure 10 is provided with at least one pair of diametrically opposed radially extending pull tabs 20 and 22. Pull tabs 20 and 22 are attached to skirt 16 by a generally S-shaped section 23. Each pull tab has two side edges 20a, 20b, 22a, 22b, said side edges meeting the S-shaped section at generously rounded junctions 20c, 20d, 22c, 22d.

Figure 3:
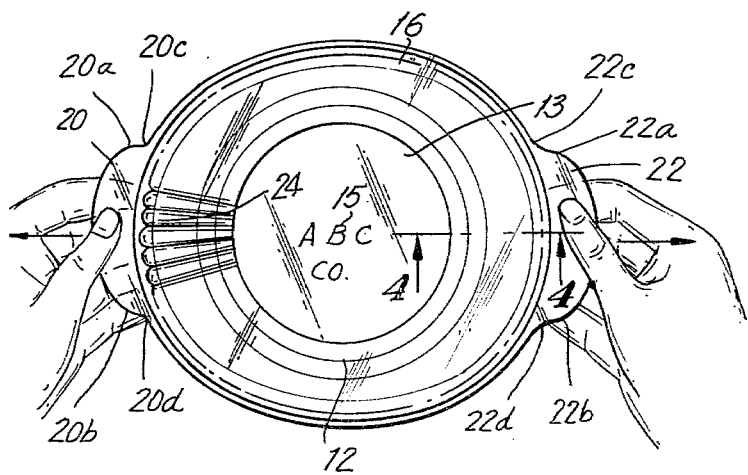
FIG. 3 is a top plan view of the closure of the present invention as it is being removed from a container.

Pull tabs 20 and 22 are capable of distorting closure 10 when they are pulled radially outwardly by a user, as shown in FIG. 3. Said distortion of closure 10 in response to the pulling of pull tabs 20 and 22 unlocks locking means 14 by radially extending same so that it clears the rim of container 12. The closure 10 can then be removed from container 12 without destroying the integrity of locking means 14, closure 10 or container 12, and hence, said closure 10, when a user desires, may be reapplied in unimpaired condition to said container 12.

In a preferred embodiment skirt 16 contains a series of flutes 24 thereon, the fluting of said skirt providing closure 10 with additional flexibility and diametric extensibility.

Because tabs 20 and 22 are connected to S-shaped section 23 by generously rounded junctions 20c, 20d, 22c and 22d, when said tabs are pulled outwardly by a user they do not fracture at their bases, but instead transmit the pulling force to the S-shaped section and the closure.

As heretofore mentioned, the comestibles in the container should be of a sufficient weight to retain said container in place on whatever horizontal surface it is placed when said pull tabs are pulled outwardly by a user. The minimum weight necessary to so retain the container in place varies with the size of the container, but is generally in the order of $\frac{1}{2}$ to 3 pounds.

Closure 10 and its associated container 12, provide a method for repeatedly storing comestibles using the same closure and container more than once. Comestibles are placed in container 12 and covered with closure 10, generally by the person selling said comestibles. A consumer stores said comestibles in said closed filled container until he desires to use a portion of same. When access to the comestibles is desired, the user unlocks the closure from the container by pulling radially outwardly on the pair of diametrically opposed pull tabs such that the retroverted locking means extends diametrically and hence, clears the container rim. Neither the closure nor the container are impaired by this pulling action. The unimpaired closure can be lifted from the container and the desired portion of edible goods removed therefrom. The user, when desired, can relock the closure on the container by refitting the locking means under the container rim.

In this manner, closure 10, when used in combination with container 12, permits a user to safely and securely store edible goods for later use and does not cause any problems when the user desires to unlock the closure from the container and gain access to said edible goods. Further, closure 10 and container 12 are such that the user may reuse both, in unimpaired condition, as many times as desired.

It will be understood, that each of the elements described above, or two or more together, may also find a useful application in other types of constructions differing from the types described above.

While the invention has been illustrated and described as embodied in a reusable resiliently distortable sheet plastic closure for application to rimmed containers of the type in which edible goods are stored, it is not intended to be limited to the details shown, since various modifications and structural changes may be made without departing, in any way, from the spirit of the present invention.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent, is set forth in the appended claims.

I claim:

1. A reusable one-piece resiliently distortable flexible sheet plastic closure for application to rimmed containers of the same size and of the type in which to store edible goods, comprising:
   (A) a crown;
   (B) a skirt downwardly dependent from the periphery of the crown and joined thereto by a generously rounded section;
   (C) retroverted means on the skirt for detachably and mechanically tightly snappingly locking the closure to the rim of the container by extending under the rim; and
   (D) at least one pair of diametrically opposed radially extending pull tabs in one-piece with the closure positioned thereon at the lower edge of the skirt and joined thereto by a generally S-shaped section, said pull tabs capable of diametrically elongatably distorting said closure when pulled radially outwardly by a user to thereby unlock said locking means by radially extending the same to clear the rim and permit removal of said closure from the container without destroying the integrity of said locking means, said closure and said container thus allowing said closure to be reapplied in unimpaired condition to said container.

2. The reusable closure of claim 1, wherein said skirt is fluted to increase its diametric extensibility.

3. The reusable closure of claim 1, wherein said closure is transparent.

4. The reusable closure of claim 1, wherein said closure is circularly shaped in plan.

5. The reusable closure of claim 1, and additionally comprising indicia means on said crown.

6. The reusable closure of claim 1, wherein said downwardly dependent side skirt has a substantial height.

7. The reusable closure of claim 1, wherein said retroverted means is an annular lip extending circumferentially around the periphery of said skirt.

8. A method for repeatedly storing comestibles in the same container using the closure of claim 1, said method comprising the steps of:
   (A) placing the edible goods in the container;
   (B) locking the closure onto the container;
   (C) opening the closure and removing it from the container by pulling radially outwardly and upwardly on the pair of diametrically opposed pull tabs;
   (D) removing from the open container that amount of edible goods desired to be used; and
   (E) relocking said unimpaired closure onto said unimpaired container.

* * * * *